United States Patent [19]

Ritsko et al.

[11] Patent Number: 4,490,340

[45] Date of Patent: Dec. 25, 1984

[54] PROCESS FOR THE RECOVERY OF HIGH PURITY TANTALUM OXIDE

[75] Inventors: Joseph E. Ritsko; Howard L. Acla, both of Towanda, Pa.

[73] Assignee: GTE Products Corporation, Stamford, Conn.

[21] Appl. No.: 584,850

[22] Filed: Feb. 29, 1984

[51] Int. Cl.$^3$ .............................................. C01G 35/00
[52] U.S. Cl. ....................................... 423/65; 423/62; 423/68
[58] Field of Search ................ 423/62, 63, 68; 75/121

[56] References Cited

U.S. PATENT DOCUMENTS

| | | | |
|---|---|---|---|
| 1,802,242 | 4/1931 | Fink et al. | 423/68 |
| 3,099,526 | 7/1963 | Li et al. | 423/68 |
| 4,302,243 | 11/1981 | Tamaru et al. | 423/68 |

FOREIGN PATENT DOCUMENTS

| | | | |
|---|---|---|---|
| 866716 | 4/1961 | United Kingdom | 423/65 |
| 956614 | 4/1964 | United Kingdom | 423/62 |

*Primary Examiner*—Herbert T. Carter
*Attorney, Agent, or Firm*—Robert E. Walter

[57] ABSTRACT

A process is disclosed for producing a high purity tantalum precipitate from an impure source by dissolving in a first hydrofluoric acid solution and digested to form a first precipitate of tantalum which dissolved in hydrochloric acid. The resulting solution is heated to form a second precipitate of tantalum which is dissolved in another hydrofluoric acid solution and digested to form a third precipitate of tantalum. The third precipitate of tantalum is then dissolved in an oxalic acid solution with the pH being adjusted to form another tantalum precipitate which is converted to tantalum oxide.

15 Claims, No Drawings

PROCESS FOR THE RECOVERY OF HIGH PURITY TANTALUM OXIDE

BACKGROUND OF THE INVENTION

This invention relates to a process for recovery of tantalum from tantalum bearing material. More particularly, it relates to a process for producing pure tantalum oxide from material such as scrap metal, metal powder, tantalum carbide, and tantalum oxides of lesser purity.

Tantalum has a high melting point (2849° C.) and is therefore qualified as construction material for equipment or machinery to be exposed to high temperatures. Furthermore, tantalum is also used as a component of many alloys. For most of these uses tantalum is desired in a high degree of purity.

Since there is a commercial demand for high purity tantalum, a process for producing high purity tantalum from sources such as scrap metal, metal powder, tantalum carbide, and tantalum oxides of lesser purity is desirable.

Typical prior art processes utilize solvent extraction or ion exchange techniques which require costly equipment. The following U.S. Pat. Nos. are typical of prior art processes: 3,107,976, 2,895,793, 2,880,060, 2,819,945, 4,182,744, 4,069,268, 4,065,405, 3,972,710.

SUMMARY OF INVENTION

It is an object of this invention to provide a process for recovery of tantalum from tantalum bearing material. It is a further object of this invention to provide a process for producing pure tantalum oxide tantalum bearing from material.

The tantalum bearing material is first contacted with a first hydrofluoric acid solution at sufficient strength to solubilize the tantalum values. The resulting insolubles are removed. The hydrofluoric acid solution is adjusted to a pH of from about 6.0 to about 8.5 with a base to form a first precipitate of tantalum which may be tantalum hydroxide and ammonium fluorotantalate which is then separated from the resulting mother liquor. The first tantalum precipitate is then dissolved in hydrochloric acid containing from about 0.2 to about 1 part of concentrated hydrochloric acid to 1 part of water. The resulting hydrochloric acid solution is then heated for a sufficient time to form a second tantalum precipitate which is then separated from the hydrochloric acid. The tantalum precipitate is then dissolved in a second hydrofluoric acid solution and the pH adjusted to from about 6.0 to about 8.5 with a base to form a third precipitate of tantalum which is then separated. The third precipitate of tantalum is then contacted with an oxalic acid solution of sufficient strength to dissolve the third precipitate. The pH of the resulting oxalic acid solution containing the tantalum values is then adjusted to from about 5.1 to about 5.4 with a base. The resulting oxalate solution is then digested at a sufficient temperature and for a sufficient time to form a first crop of tantalum hydroxide and tantalum dioxyfluoride which is then separated from the resulting mother liquor. The first crop of tantalum hydroxide and tantalum dioxyfluoride is heated for a sufficient time to form tantalum oxide.

DETAILED DESCRIPTION OF THE INVENTION

For a better understanding of the present invention, together with other and further objects, advantages, and capabilities thereof, reference is made to the following description and appended claims.

The starting material can be any hydrofluoric acid soluble scrap material containing tantalum. Preferred materials are scrap metal, metal powder, impure tantalum oxides and mixtures thereof. Non-oxidized hydrofluoric acid insoluble tantalum compounds such as tantalum carbide are first oxidized by heating in an oxidizing atmosphere. The tantalum bearing material is first contacted with a first hydrofluoric acid solution of sufficient strength and at a sufficient temperature to solubilize the tantalum values. The first hydrofluoric acid solution is generally from about 20N to about 40N with from about 25N to about 35N being preferred. Dissolution tempertures are generally from about 50° C. to about 95° C. with from about 70° C. to about 80° C. being preferred. Any insolubles are separated from the resulting hydrofluoric acid solution by any standard technique such as filtration. The pH of the first hydrofluoric acid solution is then adjusted to 6.0 to 8.0 to form a first precipitate of tantalum hydroxide and ammonium fluotantate. The base can be ammonium hydroxide which is ammonia and water. The first precipitate of tantalum hydroxide and ammonium fluorotantalate is then separated from the first mother liquor by any standard technique such as filtration. The first precipitate of tantalum is then dissolved in a solution of hydrochloric acid containing from about 0.2 parts to about 0.4 parts of concentrated hydrochloric acid to about 1 part of water. The resulting hydrochloric acid solution is then heated for a sufficient time to form a second precipitate fo tantalum of tantalum oxide. Heating times are generally from about 2 hours to about 6 hours with from about 3 hours to about 4 hours being preferred. The second precipitate of tantalum oxide is then separated from the second mother liquor by any standard technique such as filtration. The second precipitate of tantalum oxide is then contacted with a second hydrofluoric acid solution of sufficient strength and at a sufficient temperature to dissolve the second precipitate. Generally hydrofluoric acid concentrations are from about 12N to about 40N with from about 25N to about 30N being preferred. Dissoluton temperatures are generally from about 60° C. to about 100° C. with from 70° C. to about 80° C. being preferred. The pH of the second hydrofluoric acid solution containing the tantalum values is adjusted to from about 6.0 to about 8.5 with a base, preferably ammonia to form a third pecipitate of tantalum hydroxide and ammonium fluorotantalate. The third precipitate of tantalum hydroxide and ammonium fluorotantalate is then separated from the resulting third mother liquor by any standard technique such as filtration. The third precipitate of tantalum fluoride is contacted with an oxalic acid solution of sufficient strength to dissolve the third precipitate. Generally from about 0.5N to about 2.0N oxalic acid is used with from about 1.0N to about 1.5N being preferred. The pH of the resulting oxalic acid solution containing the tantalum values is adjusted to from about 5.1 to about 5.5 with a base preferably ammonia. The resulting oxalate solution is digested at a sufficient temperature and for a sufficient time to form a first crop of tantalum hydroxide and tantalum dioxyfluoride. Any temperature and time which will result in the formation of a recipitate of tantalum hydroxide and tantalum dioxyfluoride can be employed. Generally digestion temperatures are from about 60° C. to about 100° C. with from about 75° C. to about 85° C. being preferred. Digestion times are generally from about 2 hours to about 6 hours with from about 3 hours to about 4 hours being preferred. The first crop of tantalum hydroxide and tantalum dioxyfluoride is separated from the resulting fourth mother liquor by any standard technique such as filtration. The first crop of tantalum hydorxide is heated for a sufficient time to form tantalum oxide. Heating times are generally from about 2 hours to about 6 hours with from about 3 hours to about 4 hours being preferred. In order to recover any additional tantalum, the pH of the fourth mother liquor can be adjusted to from about 5.7 to about 6.0 with a base preferably ammonia, and the resulting solution digested at a sufficient temperature to precipitate a second crop of tantalum hydroxide and tantalum dioxyfluoride. Digestion temperatures are generally from about 61° C. to about 100° C. with from about 70° C. to about 80° C. being preferred. The second crop of tantalum hydroxide and tantalum dioxyfluoride is separated from the resulting fifth mother liquor by any standard technique such as filtration. The second crop of tantalum hydroxide and tantalum dioxyfluoride is heated as the first crop to form tantalum oxide.

While there has been shown and described what are at present considered the preferred embodiments of the invention, it will be obvious to those skilled in the art that various changes and modifications may be made therein without departing from the scope of the invention as defined by the appended claims.

EXAMPLE

The starting materials are scrap metal containing acid insoluble tantalum compounds such as tantalum carbide. The scrap is oxidized by heating in an oxidizing atmosphere. The tantalum bearing material is first contacted with a first hydrofluoric acid solution at about 35N at a temperature of about 80° C. Insolubles are separated from the resulting hydrofluoric acid solution by filtration. The pH of the first hydrofluoric acid solution is then adjusted to 7.0 to form a first precipitate of tantalum hydroxide and ammonium fluorotantate. The base is ammonia and water. The first precipitate of tantalum hydroxide and ammonium fluorotantalate is then separated from the first mother liquor by filtration. The first preipitate of tantalum is then dissolved in a solution of hydrochloric acid containing about 0.3 parts of concentrated hydrochloric acid to about 1 part of water. The resulting hydrochloric acid solution is then heated for about 3 hours. The second precipitate of tantalum oxide is then separated from the mother liquor by filtration. The second precipitate of tantalum oxide is then contacted with a second hydrofluoric acid solution at about 27N at a temperature of 70° C. The pH of the second hydrofluoric acid solution containing the tantalum values is adjusted to from about 7.0 with ammonia to form a third precipitate of tantalum hydroxide and ammonium fluorotantalate is then separated from the resulting third mother liquor by filtration. The third precipitate of tantalum fluoride is contacted with an oxalic acid solution at about 1.0N. The pH of the resulting oxalic acid solution containing the tantalum values is adjusted to from about 5.3 with ammonia. The resulting oxalate solution is digested at about 80° C. for about 3 hours. The first crop of tantalum hydroxide and tantalum dioxyfluoride is separated from the resulting mother liquor by such as filtration. The first crop of tantalum hydroxide is heated for about 4 hours to form tantalum oxide. To recover any additional tantalum, the pH of the mother liquor is adjusted to about 5.8 with ammonia, and the resulting solution digested to precipitate a second crop of tantalum hydroxide and tantalum dioxyfluoride. Digestion temperature is about 70° C. The second crop of tantalum hydroxide and tantalum dioxyfluoride is separated from the resulting mother liquor by filtration. The second crop of tantalum hydroxide and tantalum dioxyfluoride is heated as the first crop to form tantalum oxide.

We claim:

1. A process for producing high purity tantalum oxide from an impure source of tantalum, said process comprising:
   (a) contacting said impure source of tantalum with a first hydrofluoric acid solution of sufficient strength and at a sufficient temperature to solubilize the tantalum value and form a first hydrofluoric acid solution,
   (b) separating the first hydrofluoric acid solution from any insolubles,
   (c) adjusting the pH of said first hydrofluoric acid solution to from about 6.0 to about 8.5 with a base to form a first tantalum precipitate,
   (d) separating said first tantalum precipitate from said first hydrofluoric acid solution,
   (e) dissolving said first tantalum precipitate in an aqueous solution of hydrochloric acid containing from about 0.2 parts to about 0.4 parts of hydrochloric acid to about 1 part of water,
   (f) heating said aqueous solution of hydrochloric acid for a sufficient time to form a second tantalum precipitate, and a first hydrochloric acid solution,
   (g) separating the second tantalum precipitate from said first hyrochloric acid solution,
   (h) contacting the second tantalum precipitate with a second hydrofluoric acid solution of sufficient strength and at a sufficient temperature to dissolve said second tantalum precipitate,
   (i) adjusting the pH of said second hydrofluoric acid solution to from about 6.0 to about 8.5 with a base to form a third tantalum precipitate,
   (j) separating said third tantalum precipitate from said second hydrofluoric acid solution,
   (k) contacting said third tantalum precipitate with an oxalic acid solution of sufficient strength to dissolve said third tantalum precipitate,
   (l) adjusting the pH of the resulting oxalic acid solution to from about 5.1 to about 5.5 with a base,
   (m) digesting the resulting tantalum oxalate solution at a sufficient temperature and for a sufficient time to form fourth tantalum precipitate,
   (n) separating said fourth tantalum precipitate from a resulting oxalic acid solution,
   (o) heating said fourth tantalum precipitate for a sufficient time to form tantalum oxide.

2. A process according to claim 1 comprising:
   (a) adjusting the pH of said oxalic acid solution of step (n) to from about 5.7 to about 6.0 with a base,
   (b) digesting said oxalic acid solution of step (a) at a sufficient temperature to precipitate a fifth tantalum precipitate,
   (c) separating said fifth tantalum precipitate,
   (d) heating said fifth tantalum precipitate at a sufficient time to form additional tantalum oxide.

3. A process according to claim 2 wherein said fifth tantalum precipitate is heated for from about 2 hours to about 6 hours.

4. A process according to claim 1 wherein said impure source of tantalum is selected from the group consisting of tantalum scrap metal, tantalum metal powder, tantalum oxides, and mixtures thereof.

5. A process according to claim 1 wherein said impure source is contacted in step (a) with a first hydrofluoric acid solution of from about 12N to about 40N at from about 60° C. to about 100° C.

6. A process according to claim 1 wherein in step C said base is ammonia.

7. A process according to claim 1 wherein said aqueous solution of hydrochloric acid in step (f) is heated for from about 2 hours to about 6 hours.

8. A process according to claim 1 wherein said tantalum precipitate in step (h) is contacted with said second hydrofluoric acid solution of from about 12N to about 40N at from about 60° C. to about 100° C.

9. A process according to claim 1 wherein said third tantalum precipitate in step (j) is contacted with an oxalic acid solution of from about 0.5N to about 2.0N.

10. A process according to claim 1 wherein said tantalum oxalate solution of step (m) is digested at a temperature of from about 60° C. to about 100° C.

11. A process according to claim 10 wherein the digestion time is from about 2 hours to about 6 hours.

12. A process according to claim 1 wherein said oxalate solution of step (m) is digested at a temperature of from about 60° C. to about 100° C.

13. A process according to claim 1 wherein said impure source is tantalum oxide.

14. A process according to claim 13 wherein said tantalum oxide is obtained by heating non-oxidized hydrofluoric acid insoluble tantalum compound in an oxidizing atmosphere to convert said tantalum compound to tantalum oxide.

15. A process according to claim 1 wherein said impure source is tantalum carbide.

* * * * *